(12) United States Patent
Matsuura et al.

(10) Patent No.: US 12,442,906 B2
(45) Date of Patent: Oct. 14, 2025

(54) ULTRASONIC SENSOR

(71) Applicant: DENSO CORPORATION, Kariya (JP)

(72) Inventors: Mitsuyasu Matsuura, Nisshin (JP); Taketo Harada, Nisshin (JP); Tetsuya Aoyama, Kariya (JP); Yu Koyama, Kariya (JP); Takuya Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 61 days.

(21) Appl. No.: 17/477,268

(22) Filed: Sep. 16, 2021

(65) Prior Publication Data
US 2022/0003856 A1 Jan. 6, 2022

Related U.S. Application Data

(62) Division of application No. 16/306,977, filed as application No. PCT/JP2017/019961 on May 29, 2017, now abandoned.

(30) Foreign Application Priority Data

Jun. 7, 2016 (JP) .................. 2016-113866

(51) Int. Cl.
*G01S 7/526* (2006.01)
*G01S 7/52* (2006.01)
(Continued)

(52) U.S. Cl.
CPC .......... *G01S 7/526* (2013.01); *G01S 7/52004* (2013.01); *G01S 15/93* (2013.01);
(Continued)

(58) Field of Classification Search
CPC ...... G01S 7/526; G01S 7/52004; G01S 15/93; G01S 2007/52007; G01S 2015/937; G01N 2291/014
See application file for complete search history.

(56) References Cited

U.S. PATENT DOCUMENTS

2002/0023498 A1 * 2/2002 Tsuzuki .................. G01N 29/38
73/609
2011/0241858 A1 * 10/2011 Tsuzuki .................... G01S 7/54
340/435
(Continued)

FOREIGN PATENT DOCUMENTS

DE 102010021960 A1 * 12/2011 .......... G01S 15/931
JP 2001-221849 A 8/2001
(Continued)

OTHER PUBLICATIONS

U.S. Appl. No. 16/306,977 and its entire file history, filed Dec. 4, 2018, Matsuura et al.

*Primary Examiner* — Isam A Alsomiri
*Assistant Examiner* — Abdallah Abulaban
(74) *Attorney, Agent, or Firm* — Maschoff Brennan

(57) ABSTRACT

An ultrasonic sensor (10), that transmits probe waves which are ultrasonic waves and acquires detection waves including reflected waves which have been reflected from surrounding objects, includes a transmitter/receiver (12) that transmits the probe waves and acquires the detection waves, a detection wave processing section (13) that executes processing for passing a predetermined frequency band which includes the frequency of the probe waves, an amplitude measurement section (14) which measures the amplitude of the detection waves, and a judgement section (17) which judges whether there is adherence of foreign matter on the transmitter/receiver, based on a relationship between a time axis and values of the amplitude of the detection waves during a reverberation interval following the termination of transmitting the probe waves.

14 Claims, 8 Drawing Sheets

(51) Int. Cl.
 *G01S 15/93* (2020.01)
 *G01S 15/931* (2020.01)
(52) U.S. Cl.
 CPC .............. *G01N 2291/014* (2013.01); *G01S 2007/52007* (2013.01); *G01S 2015/937* (2013.01)

(56) References Cited

U.S. PATENT DOCUMENTS

| | | | |
|---|---|---|---|
| 2013/0322688 A1* | 12/2013 | Tsuchiya | G08G 1/167 382/103 |
| 2014/0355385 A1* | 12/2014 | Inagaki | G01S 15/931 367/99 |
| 2016/0209509 A1 | 7/2016 | Naruse et al. | |
| 2018/0156916 A1 | 6/2018 | Nomura et al. | |

FOREIGN PATENT DOCUMENTS

| | | |
|---|---|---|
| JP | 2002-148347 A | 5/2002 |
| JP | 2011-215002 A | 10/2011 |
| JP | 2014-232070 A | 12/2014 |
| JP | 2015-040837 A | 3/2015 |
| JP | 2017-015493 A | 1/2017 |

* cited by examiner

FIG.2
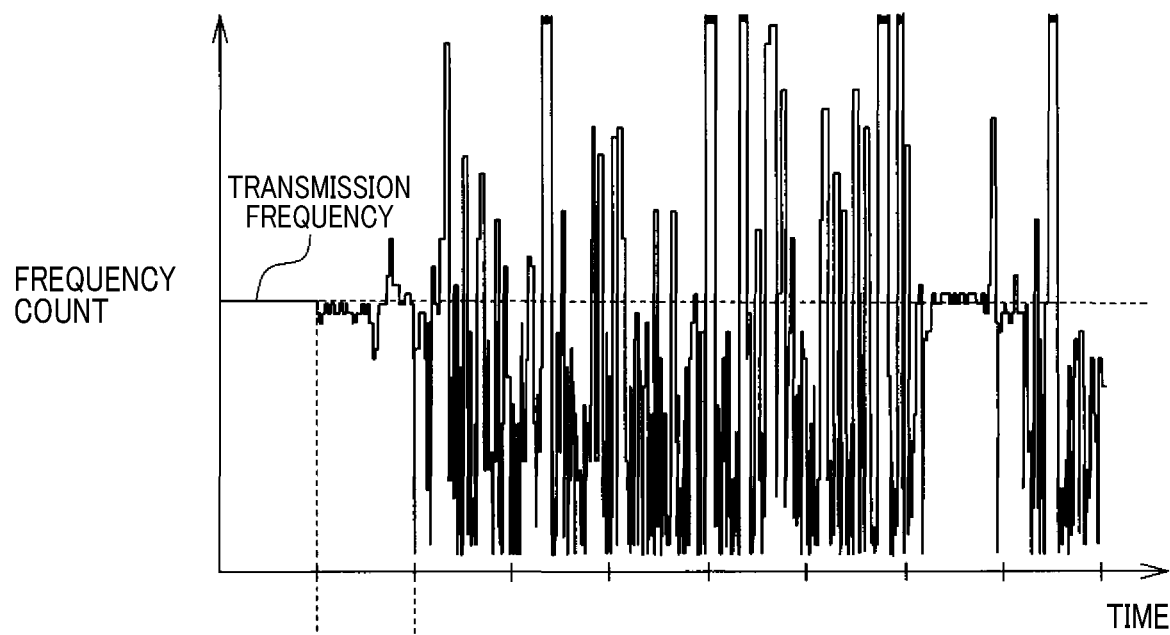
(a)
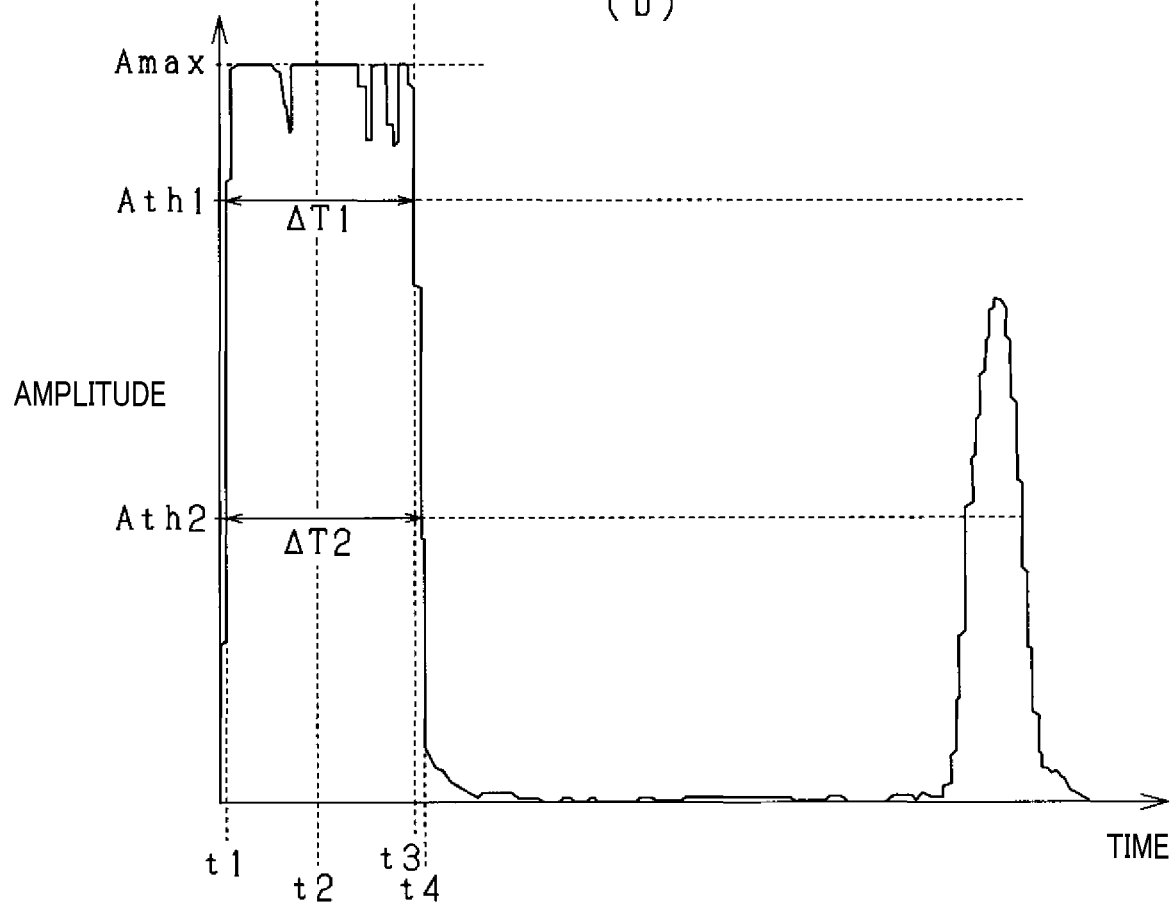
(b)

FIG.3
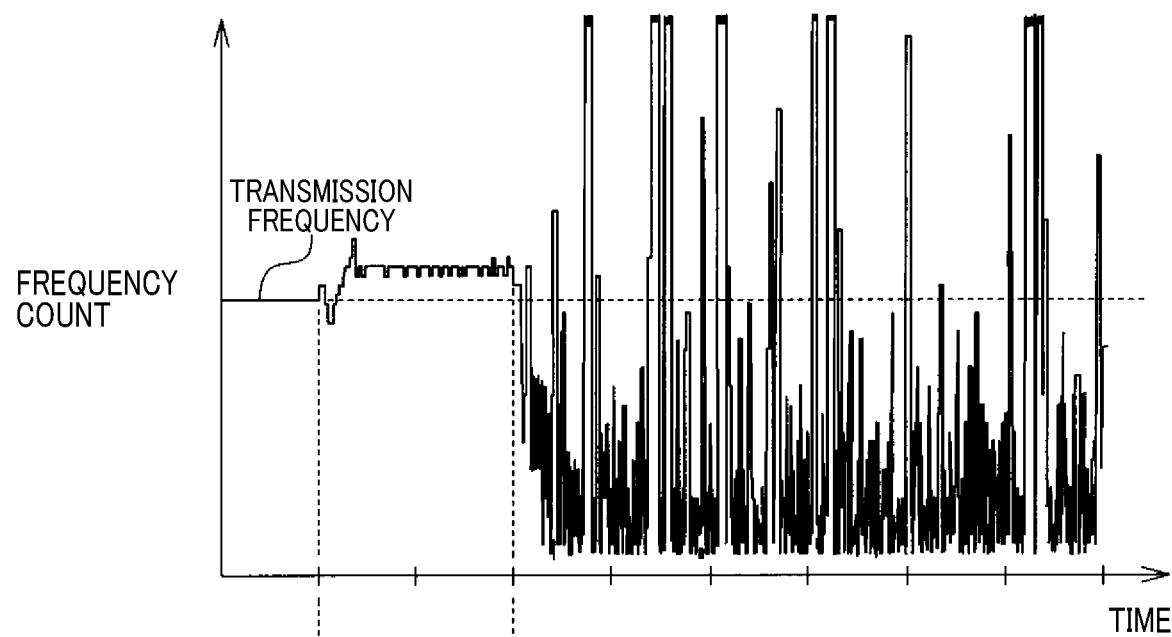
(a)
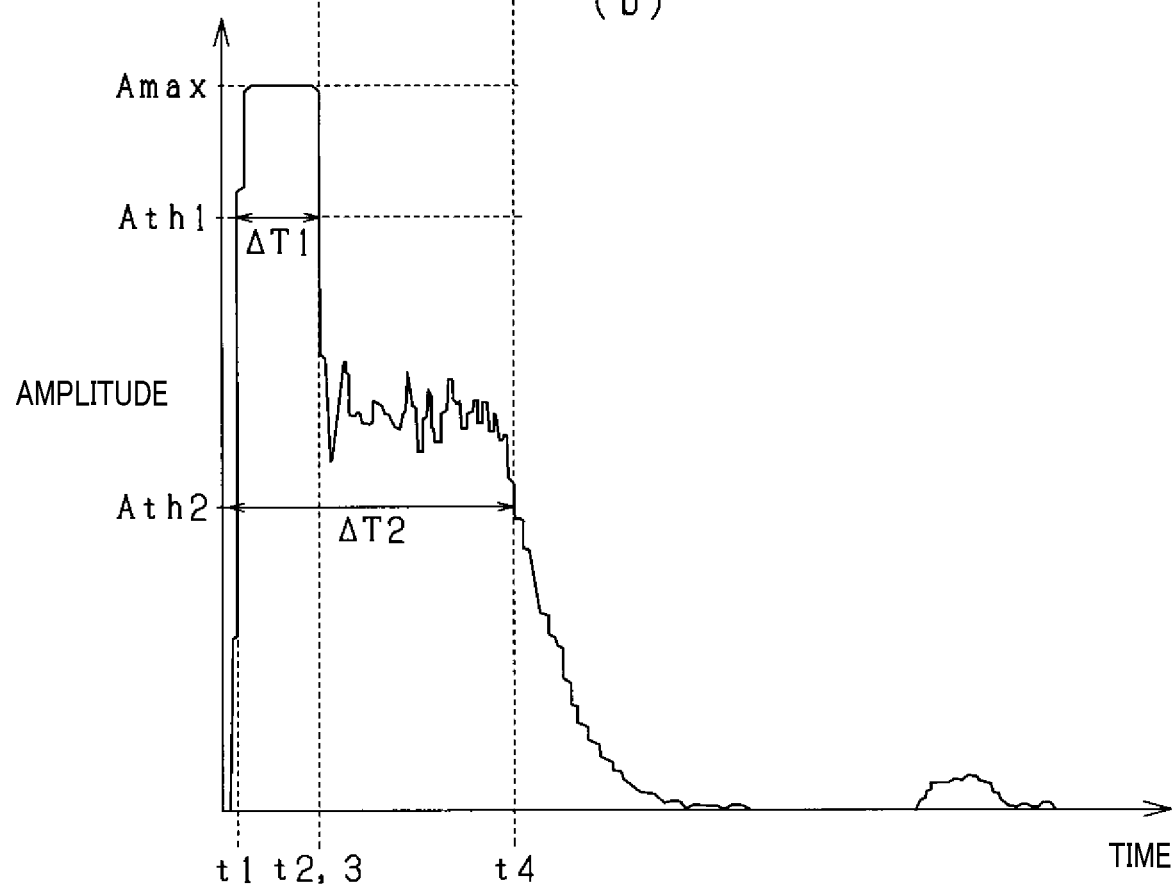
(b)

ULTRASONIC SENSOR

CROSS-REFERENCE TO RELATED APPLICATIONS

This application is divisional application of U.S. application Ser. No. 16/306,977, filed on Dec. 4, 2018, which is a national stage application of PCT Application No. PCT/JP2017/019961, filed on May 29, 2017, which claims priority to Japanese Patent Application No. 2016-113866, filed in Japan Patent Office on Jun. 7, 2016, the entire contents of which are incorporated herein by reference.

TECHNICAL FIELD

The present disclosure relates to an ultrasonic sensor that transmits ultrasonic waves as probe waves, and acquires reflected waves that are reflected from objects in the surroundings, with the reflected waves including detection waves.

BACKGROUND ART

In the prior art, ultrasonic sensors have been implemented which transmit ultrasonic waves as probe waves, receive reflected waves that are reflected from an object, and detect the distance of the object. With such an ultrasonic sensor, when foreign matter such as water or the like adheres to a transmitter/receiver which performs transmission of the probe waves and reception of the detection waves, there is a danger that errors will arise in the calculated distances of objects, or an object may be judged to exist where it does not, or it may be judged that there is no object when an object actually does exist. Hence, it is necessary to be able to judge whether or not there is foreign matter adhering to the transmitter/receiver.

An ultrasonic sensor which judges when there is foreign matter adhering to the transmitter/receiver is disclosed in PTL 1. With the ultrasonic sensor disclosed in PTL 1, judgement as to whether or not there is foreign material adhering to the transmitter/receiver is made by using a time point at which an amplitude falls below a set threshold value.

CITATION LIST

Patent Literature

[PTL 1] Japan Patent Publication No. 2015-40837

SUMMARY OF THE INVENTION

In a case where foreign matter such as water or mud adheres to the surface of the ultrasonic sensor, a change will occur in frequency due to the effects of the mass, etc., of the foreign matter. In general with an ultrasonic sensor, the amplitude is acquired after passing a received signal through a bandpass filter for removal of noise, and hence, if there is a change in the reverberation frequency, the amplitude will not decrease gradually but will vary in a stepwise manner. Thus, with the ultrasonic sensor of PTL1, it is not possible to accurately obtain time point at which the amplitude falls below the threshold value, and hence, it is difficult to accurately judge whether or not there is adherence of foreign matter.

The present disclosure is intended to overcome the above problem, having a main objective of providing an ultrasonic sensor which can accurately judge when there is foreign matter adhering to the surface of a transmitter/receiver.

The present disclosure relates to an ultrasonic sensor that transmits probe waves which are ultrasonic waves and acquires detection waves including reflected waves that are reflected from surrounding objects, and includes a transmitter/receiver that transmits the probe waves and acquires the detection waves, a detection wave processing section that executes processing for passing a predetermined band of frequencies which include the frequency of the probe waves, an amplitude measurement section which measures the amplitude of the detection waves, and a judgement section that judges the adherence of foreign matter on the transmitter/receiver, based on a relationship between a time axis and values of the amplitude of the detection waves during a reverberation interval which follows the termination of transmitting the probe waves.

In a case where there is no foreign matter adhering to the transmitter/receiver, then the frequency of a reverberation, which is produced following termination of transmitting the probe waves, will be close to the frequency of the probe waves. In that case, even when processing for passing a prescribed band of frequencies is executed by the detection wave processing section on the detection waves, in acquiring the amplitude of the reverberation, the detection waves will not be readily attenuated. On the other hand, if there is foreign matter adhering to the transmitter/receiver, then the frequency of the reverberation that is produced following termination of transmitting the probe waves will differ from the frequency of the probe waves. In that case, when processing for passing a prescribed band of frequencies is executed by the detection wave processing section, in acquiring the amplitude in the reverberation interval, detection waves that are outside the prescribed band of frequencies will become attenuated and the accompanying amplitude will become small. Hence, if foreign matter is adhering to the transmitter/receiver, then the amplitude will become smaller than when there is no foreign matter adhering, and this condition of the amplitude being small will continue during the reverberation interval. With the above configuration, a decision as to whether foreign matter is adhering to the transmitter/receiver is made based on a relationship between time and amplitude in the reverberation interval following termination of transmitting the probe waves, and hence, even if processing is executed on the detection waves for passing a prescribed band of frequencies, the adherence of foreign matter can be accurately detected.

BRIEF DESCRIPTION OF THE DRAWINGS

The above and other objectives, features and advantages of the present disclosure will be made clearer from the following detailed description, referring to the appended drawings.

FIG. 2 shows waveforms for a case in which foreign matter does not adhere to a transmitter/receiver, with (a) being the waveform of frequency and (b) being the waveform of amplitude;

FIG. 3 shows waveforms for a case in which foreign matter adheres to the transmitter/receiver, with (a) being the waveform of frequency and (b) being the waveform of amplitude;

DESCRIPTION OF THE EMBODIMENTS

Description of Embodiments

The present embodiment of an ultrasonic sensor is installed on a mobile body such as a vehicle or the like. An object detection system, which includes the ultrasonic sensor that transmits probe waves in each of prescribed control periods, receives reflected waves that are reflected from an object in the surroundings of the mobile body, and measures the time duration between transmission and reception, for thereby obtaining the distance between the mobile body and the object.

Figure 1:
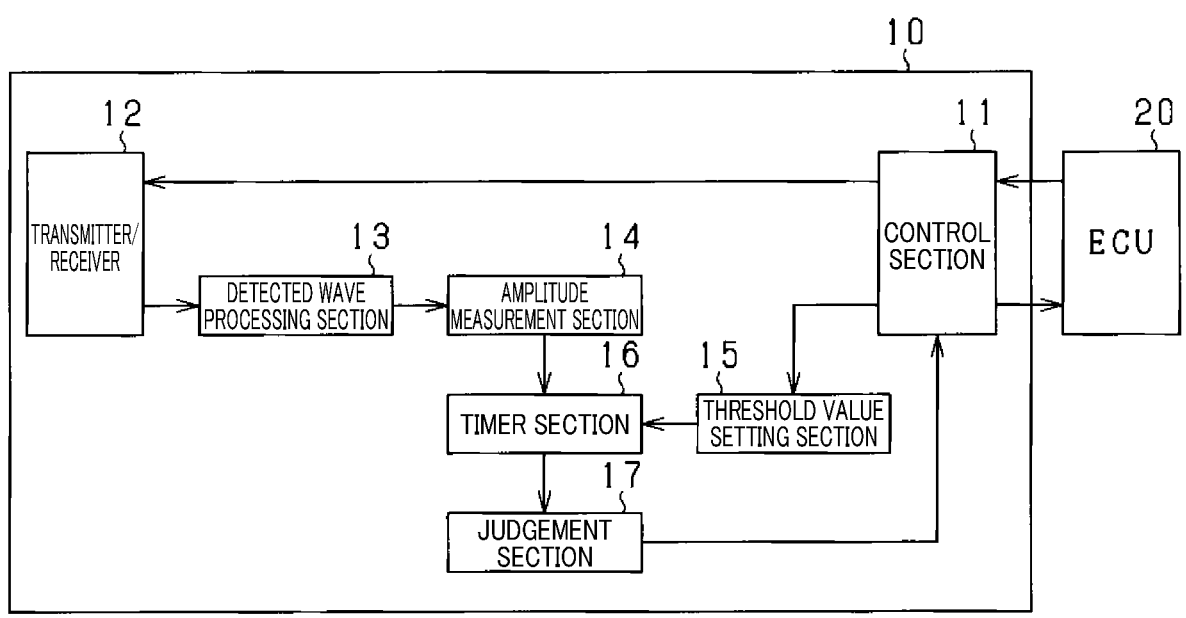
FIG. 1 is a configuration diagram of an ultrasonic sensor.

FIG. 1 is a configuration diagram of an ultrasonic sensor 10 of the present embodiment. The ultrasonic sensor 10 is connected for communication with an ECU 20 which controls respective functions of the vehicle, with the ultrasonic sensor 10 being controlled based on commands from the ECU 20, and transmitting detection results to the ECU 20.

A control section 11 communicates with the ECU 20, and executes control for transmitting probe waves which are ultrasonic waves, based on commands from the ECU 20, while also transmitting to the ECU 20 the detection results of detection waves that include reflected waves. At that time, the ECU 20 notifies the control section 11 of the frequency of the probe waves, and the control section 11 drives a transmitter/receiver 12 such as to transmit ultrasonic waves having that frequency.

The transmitter/receiver 12 is of known type, being equipped with a piezoelectric element and a drive circuit which supplies drive power to the piezoelectric element, with the drive power being supplied by the transmitter/receiver 12 to the piezoelectric element by means of control signals from the control section 11, for transmitting probe waves that are ultrasonic waves.

The transmitter/receiver 12 in addition receives, as detection waves, reflected waves that are reflected from objects in the surroundings, and also receives other ultrasonic waves as detection waves. The detection waves received by the transmitter/receiver 12 are inputted to the detection wave processing section 13 as voltages.

A detection wave processing section 13 performs filter processing of the detection waves. Specifically, filter processing of the detection waves is executed using a bandpass filter having a passband that can pass a band of frequencies which include the frequency of the probe waves, attenuating the amplitude of detection waves that are at frequencies other than those of the band of frequencies passed by the bandpass filter. The reason for this is that, when probe waves are reflected from an object and the reflected waves are acquired as detection waves, the frequency of the reflected waves will be close to the frequency of the probe waves, while detection waves having a different frequency have a high possibility of being noise. The detection wave processing section 13 inputs the voltage value to an amplitude measurement section 14, after filter processing.

The amplitude measurement section 14 measures the amplitude of the acquired detection waves. Specifically, to acquire the amplitude, a value of voltage that is obtained based on the detection waves is converted to the amplitude. In detecting the amplitude, an upper limit value is determined for the voltage that can be acquired, and if the acquired voltage has a value exceeding the upper limit, the amplitude is made the upper limit value Amax.

The amplitude that is measured by the amplitude measurement section 14 will be explained referring to FIGS. 2 and 3, based also on the frequency of the detection waves. The frequencies shown in FIGS. 2(*a*) and 3(*a*) are obtained, for example, by taking the points at which the voltage changes from positive to negative as zero crossing points, and calculating the inverse of the period between the zero crossing points as a frequency. The frequency count values in the diagrams show the measured numbers of reference waves between the zero crossing points of the detection waves. That is to say, if the value of the frequency count becomes large, this signifies that the time between the zero crossing points becomes longer and that the frequency becomes lower.

Since the amplitude of the ultrasonic waves is obtained as an alternation between positive and negative values, the positive peaks for each frequency define the amplitude at that frequency. FIGS. 2(*b*) and 3(*b*) show connected amplitudes that are maximum positive values for the respective frequencies, that is to say, these diagrams show the result of envelope detection.

As described above, the detection wave processing section 13 performs processing for attenuating waves having frequencies other than those of the prescribed frequency band of the bandpass filter. Hence, if foreign matter adheres to the surface of the transmitter/receiver 12 and causes the frequency in the reverberation interval to change, then as shown in FIG. 3(*a*), the amplitude will be attenuated by the bandpass filter, and the amplitude will be reduced by comparison with the case in which there is no adherence of foreign matter, as shown in FIG. 3(*b*). If judgement is made based only on whether or not the amplitude is small, then it is not possible to determine whether the amplitude has become small due to adhering foreign matter, or has become small due to the fact that the reverberation interval has ended. However, if the amplitude remains above a prescribed value during a prescribed range of time, then it is judged that there is adhering foreign matter. It should be noted that the foreign matter may include snow, water, mud, etc., while the expression "adhering" can signify a condition in which water is flowing on the surface of the transmitter/receiver 12.

As shown in FIGS. 2(*b*), 3(*b*), a first threshold value Ath1 and a second threshold value Ath2, which is smaller than the first threshold value Ath1, are set. The specific values of the first threshold value Ath1 and the second threshold value Ath2 are determined through experiment, and are set by a threshold value setting section 15 and inputted to a timer section 16.

The timer section 16 measures, as a first interval ΔT1, an interval for which the amplitude is higher than the first threshold value Ath1, and measures, as a second interval ΔT2, an interval for which the amplitude is higher than the second threshold value Ath2. The amplitude may momentarily fall below the first threshold value Ath1, due to errors in detecting the amplitude, etc., even when there is no foreign matter adhering to the transmitter/receiver 12. Furthermore, the amplitude may in some cases momentarily fall below the second threshold value Ath2, when there is foreign matter adhering to the transmitter/receiver 12, even during the reverberation interval. Hence, for the first interval ΔT1 and the second interval ΔT2, it would be equally possible to terminate the time measurement on condition that the amplitude has been below the first threshold value Ath1 or the second threshold value Ath2 continuously during a prescribed sampling period.

A judgement section 17 calculates the time that elapses from the point at which the amplitude falls below the first threshold value Ath1 until it falls below the second threshold value Ath2. Specifically, the judgement section 17 acquires the first interval ΔT1 and the second interval ΔT2 from the timer section 16, and subtracts the first interval ΔT1 from the second interval ΔT2. A decision is then made as to whether or not the calculated interval is a value that is greater than a prescribed value. If the calculated value is greater than the prescribed value, then it can be said that the amplitude in the reverberation interval has remained above the prescribed value during a time interval that is within the prescribed range. Hence, the judgement result is transmitted to the control section 11.

When the control section 11 acquires a judgement result from the judgement section 17 indicating that there is adherence of foreign matter, processing is then executed for notifying this to a driver of the vehicle. Specifically, the judgement result is transmitted to the ECU 20, and the driver of the vehicle is notified by use of a display apparatus, etc., installed in the vehicle. It should be noted that the processing which is executed when it is judged that there is foreign matter adhering to the transmitter/receiver 12 is not limited to this example, and it would be equally possible to execute various other forms of processing.

Figure 4:
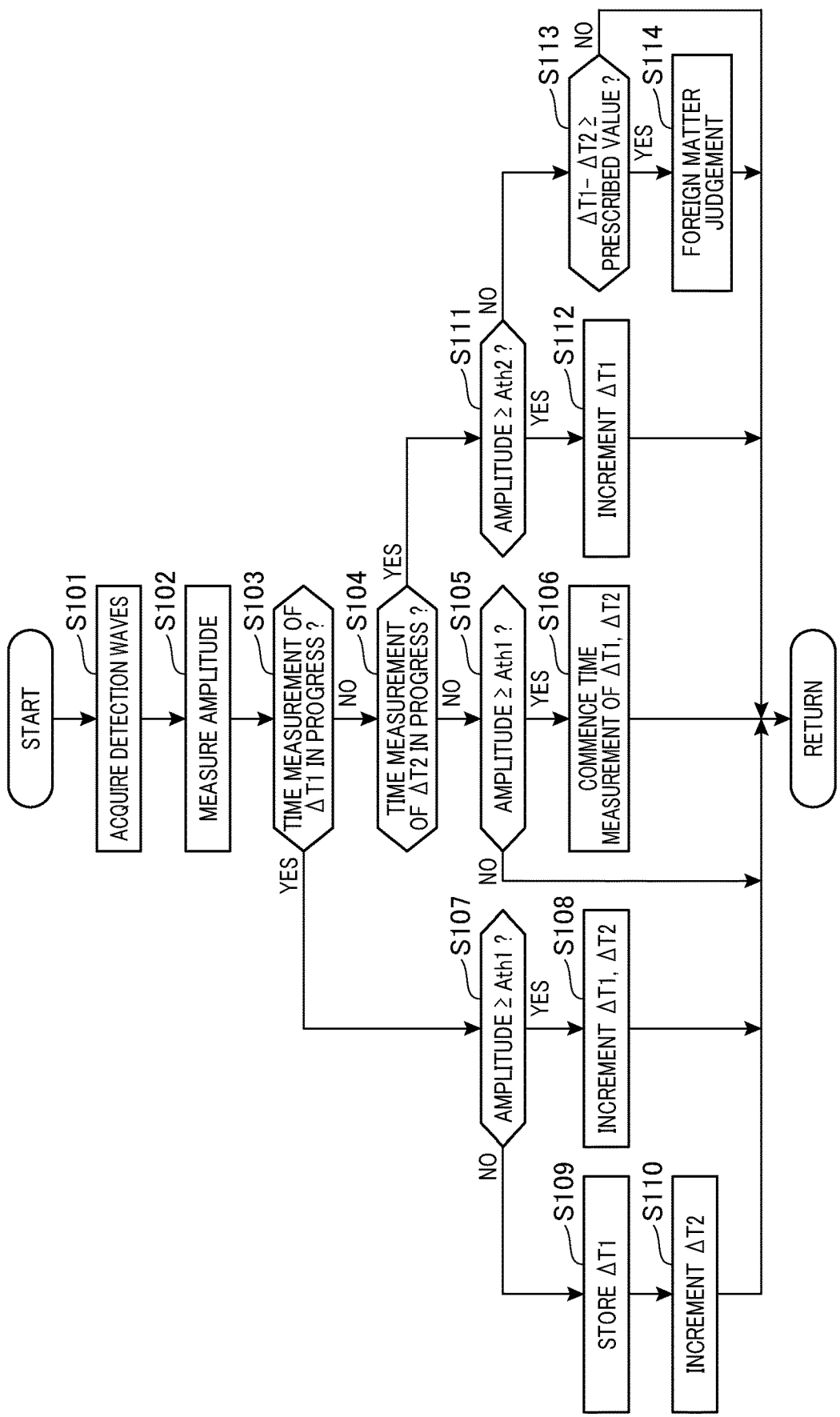
FIG. 4 is a flow chart of processing executed by the ultrasonic sensor.

The processing sequence executed by the ultrasonic sensor 10 will be described referring to the flow chart of FIG. 4. The processing of the flow chart of FIG. 4 is executed repetitively at each of prescribed sampling periods.

Firstly, in step S101, the detection waves are acquired, and then in step S102, the amplitude is measured. In step S103, a decision is made as to whether or not the time measurement of the first interval ΔT1 is in progress. It is possible to judge in this way whether or not the value of the first interval ΔT1 is zero. Step S103 can be performed by judging whether the value of the first interval ΔT1 is not zero, or by judging a flag which indicates that the time measurement of the first interval ΔT1 is in progress. As described above, since the time measurement of the first interval ΔT1 and that of the second interval ΔT2 are started concurrently, if the time measurement of first interval ΔT1 is in progress, then the time measurement of the second interval ΔT2 is also in progress.

If there is a positive judgement decision in step S103, that is to say, the time measurement of the first interval ΔT1 is not in progress, then the processing proceeds to step S104, in which a decision is made as to whether or not the time measurement of the second interval ΔT2 is in progress. In the same way as for step S103, step S104 can be performed by judging whether the value of the second interval ΔT2 is not zero, or by judging a flag which indicates that the time measurement of the second interval ΔT2 is in progress.

If there is a negative decision in step S104, that is to say, the time measurement of the second interval ΔT2 is not in progress, processing then proceeds to step S105, in which a decision is made as to whether the amplitude measured in step S102 is higher than the first threshold value Ath1. As described above, processing proceeds to step S105 if a negative decision is reached in both step S103 and step S104, so that reaching a positive decision in step S105 is limited to the case in which the amplitude exceeds the first threshold value Ath1 for the first time after transmitting of the probe waves has started. A negative decision in step S105 is reached in an interval which extends from the start of transmitting the probe waves until the amplitude reaches the first threshold value Ath1, or in an interval which follows the time at which the amplitude falls below the second threshold value Ath2, that is to say, an interval which follows the end of the of the reverberation interval.

If there is a positive decision in step S105, that is to say, if it is judged that the amplitude exceeds the first threshold value Ath1, then the time measurement of the first interval ΔT1 and the second interval ΔT2 is started, and the processing sequence is then ended. Step S106 in the processing sequence is executed at time point t1 shown in FIGS. 2 and 3. On the other hand, in a case in which there is a positive decision made in step S105, that is to say, it is judged that the amplitude is not greater than the first threshold value Ath1, then the processing sequence is ended directly.

If there is a positive decision in step S103, that is to say, in a case in which the time measurement of the first interval ΔT1 is in progress, then processing proceeds to step S107, in which a decision is made as to whether or not the amplitude exceeds the first threshold value Ath1. If there is a positive decision in step S107, that is to say, the amplitude that has been measured in step S102 is greater than first threshold value Ath1, then processing proceeds to step S108, in which the first interval ΔT1 and second interval ΔT2 are incremented. That is to say, the time measurement of the first interval ΔT1 and second interval ΔT2 is continued. Step S108 of the processing sequence is executed in an interval that extends from after time point t1 until time point t2, shown in FIGS. 2 and 3. The processing sequence is then ended.

If there is a negative decision in step S107, that is to say, if the amplitude that was measured in step S102 is less than the first threshold value Ath1, then processing proceeds to step S109. In step S109 the value of the first interval ΔT1 is stored in temporary memory, and in the succeeding step S110, incrementing of the second interval ΔT2 is performed. The time measurement of the second interval ΔT2 is continued, while ending the time measurement of the first interval ΔT1. Step S110 of the processing sequence is executed in the next sampling period after time point t2, shown in FIGS. 2 and 3. The processing sequence is then ended.

If there is a positive decision in step S104, that is to say, if the time measurement of the first interval ΔT1 has ended and the time measurement of the second threshold value Ath2 is in progress, then processing proceeds to step S111, in which a decision is made as to whether or not the amplitude is greater than the second threshold value Ath2. If there is a positive decision in step S111, that is to say, if the amplitude measured in step S102 is greater than the second threshold value Ath2, then processing proceeds to step S112, in which incrementing of the second interval ΔT2 is performed. That is to say, the time measurement of the second interval ΔT2 is continued. Step S112 of the processing sequence is executed in an interval that extends from after the next sampling period following time point t2, shown in FIGS. 2 and 3, up to time point t3. The processing sequence is then ended.

If there is a negative decision in step S111, that is to say, if the amplitude measured in step S102 is less than the second threshold value Ath2, then processing proceeds to step S113. In step S113, the value of first interval ΔT1 that has been temporarily stored in memory is subtracted from the value of the second interval ΔT2 whose time measurement has been completed, and a decision is made as to whether the resultant value is greater than a prescribed value. That is to say, a decision is made as to whether or not the length of the interval for which the amplitude is less than the first threshold value Ath1 and above the second threshold value Ath2 is greater than a prescribed value. Step S113 of the processing sequence is executed in the next sampling period following time point t3, shown in FIGS. 2 and 3.

If there is a positive decision in step S113, that is to say, if the length of the interval for which the amplitude is less than the first threshold value Ath1 and above the second threshold value Ath2 is greater than the prescribed value, then processing proceeds to step S114, and a judgement is made as to whether or not there is foreign matter adhering to the surface of the transmitter/receiver 12. The processing sequence is then ended. However, if there is a negative decision in step S113, then the processing sequence is ended directly.

Due to the above configuration, the ultrasonic sensor 10 of the present embodiment provides the following effects.

If there is foreign matter adhering to the transmitter/receiver 12, then the frequency of a reverberation that is produced following the transmitting of the probe waves becomes different from the frequency of the probe waves. If filter processing is performed by the detection wave processing section 13 at that time, then since detection waves that are at frequencies outside the passband of the filter will become attenuated, the amplitude will be reduced. For that reason it can be considered that if the amplitude is greater than the first threshold value Ath1, then the frequency during the reverberation interval is close to the frequency when transmitting the probe waves, while if the amplitude is smaller than the second threshold value Ath2 then it can be considered that the reverberation interval has ended. On the other hand, if an interval continues during which the amplitude is less than the first threshold value Ath1 and is greater than the second threshold value Ath2, then it can be assumed that the interval is the reverberation interval and that the frequency in that interval deviates from that of the probe waves. With the present embodiment, the time interval which elapses from the point at which the amplitude falls below the first threshold value Ath1 until it falls below the second threshold value Ath2 is acquired, and by judging whether or not that interval is longer than a prescribed interval, a decision can be made as to whether or not the frequency during the reverberation interval deviates from the frequency of the probe waves. Hence, an accurate judgement can be made as to whether or not there is foreign matter adhering to the transmitter/receiver 12.

Second Embodiment

The present embodiment differs from the first embodiment with respect to a part of the processing executed by the judgement section 17. Specifically, the judgement section 17 acquires a number of times that local maximums of the amplitude are attained in a prescribed interval following the time at which the amplitude falls below the first threshold value Ath1. This number of occurrences of local maximums is taken to be the number of times that the amplitude changes from an increasing to a decreasing condition. It should be noted that if the amplitude, after having once increased then remains constant, and thereafter decreases, then this can be taken as being a single occurrence of a local maximum value.

The judgement section 17 compares the counted number of local maximums of the amplitude with a predetermined value. If the number of local maximums is greater than the predetermined value, then it is judged that there is adherence of foreign matter.

Figure 5:
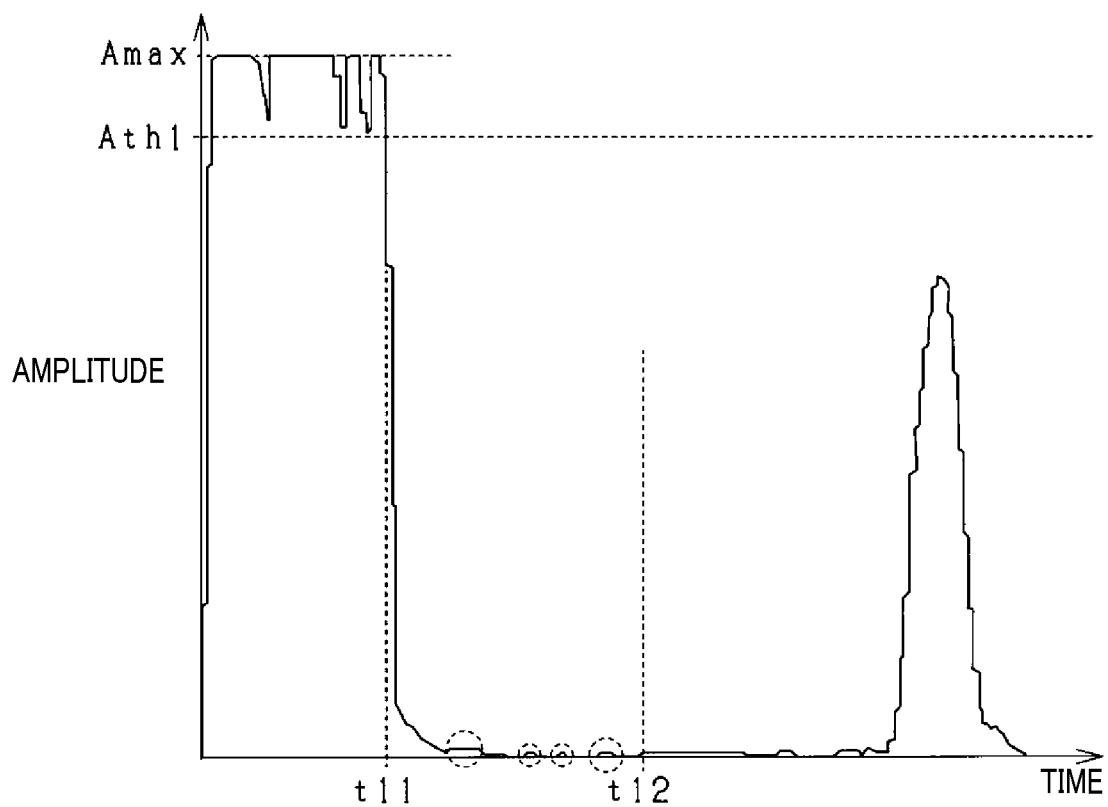
FIG. 5 is a diagram for describing processing relating to a second embodiment, for the case in which foreign matter does not adhere to the transmitter/receiver.
Figure 6:
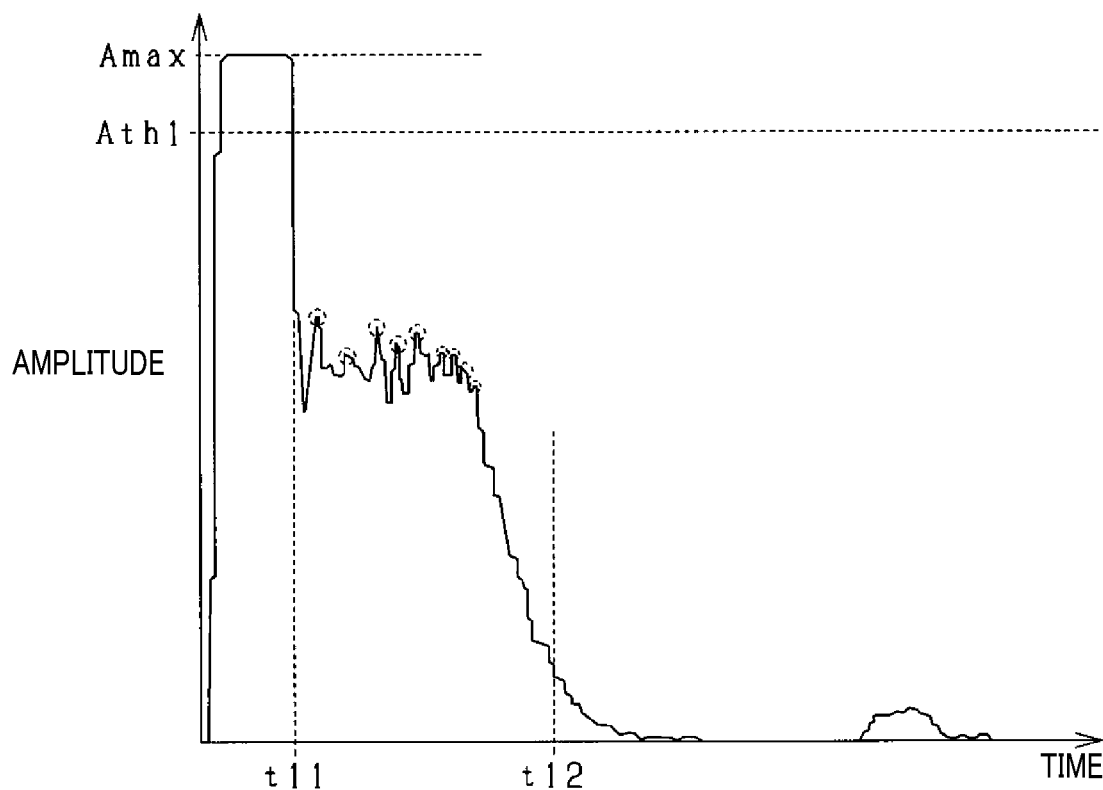
FIG. 6 is a diagram for describing processing relating to the second embodiment, for the case in which foreign matter adheres to the transmitter/receiver.

The processing applied to the amplitude with the present embodiment will be described referring to FIGS. 5 and 6. In FIGS. 5 and 6, the positions where there are local maximums are surrounded by dashed lines.

As shown in FIG. 5, if there is no foreign matter adhering to the transmitter/receiver 12, then the time at which the amplitude falls below the first threshold value Ath1 is time point t11 at which the reverberation interval ends. After falling below the first threshold value Ath1 at time point t11, the amplitude thereafter continues to decrease, and a condition is reached at which it is hardly possible to detect the amplitude. For that reason, in a prescribed interval beginning from time point t11 and elapsing at time point t12, the acquired number of local maximums of the amplitude becomes small.

On the other hand, as shown in FIG. 6, if there is foreign matter adhering to the transmitter/receiver 12, then time point t11 at which the amplitude falls below the first threshold value Ath1 is the time at which transmitting the probe waves is ended. Since the interval of attenuation following time point at which the amplitude falls below the first threshold value Ath1 is a continuation of the reverberation interval, the amplitude repetitively increases and decreases in the vicinity of a certain value. For that reason, the acquired number of local maximums attained by the amplitude becomes large during a prescribed interval which extends from time point t11 and elapses when a certain time point t12 is reached.

Due to the above configuration, the ultrasonic sensor 10 of the present embodiment provides the following effects, in addition to effects similar to those provided by the ultrasonic sensor 10 of the first embodiment.

If there is no foreign matter adhering to the transmitter/receiver 12, then when the amplitude falls below the first threshold value Ath1, this signifies that the reverberation interval has ended, so that the amplitude will continue to gradually decrease after having fallen below the first threshold value Ath1, until the value can hardly be detected. For that reason, the acquired number of local maximums of the amplitude will become small. On the other hand, if there is foreign matter adhering to the transmitter/receiver 12, then when the amplitude falls below the first threshold value Ath1, this signifies that the transmission of probe waves has ended, and during the reverberation interval thereafter the amplitude will repetitively increase and decrease, and hence, the number of local maximums of the amplitude will increase. Hence, by counting the number of local maximums during a prescribed interval extending from time point at which the amplitude falls below the first threshold value Ath1, a judgement can be made as to whether or not there is foreign matter adhering to the transmitter/receiver 12.

Third Embodiment

The present embodiment differs from the first embodiment with respect to a part of the processing executed by the judgement section 17. Specifically, the judgement section 17 provides a prescribed period in the reverberation interval, and obtains the number of times that local maximum value of amplitude are attained during that prescribed period. The prescribed period is set such as to include at least part of the reverberation interval, and with the present embodiment, the prescribed period commences when the transmitting of the probe waves is ended. The processing for obtaining the number of times that local maximum value of amplitude are attained are the same as for the second embodiment, so that specific description is omitted.

Figure 7:
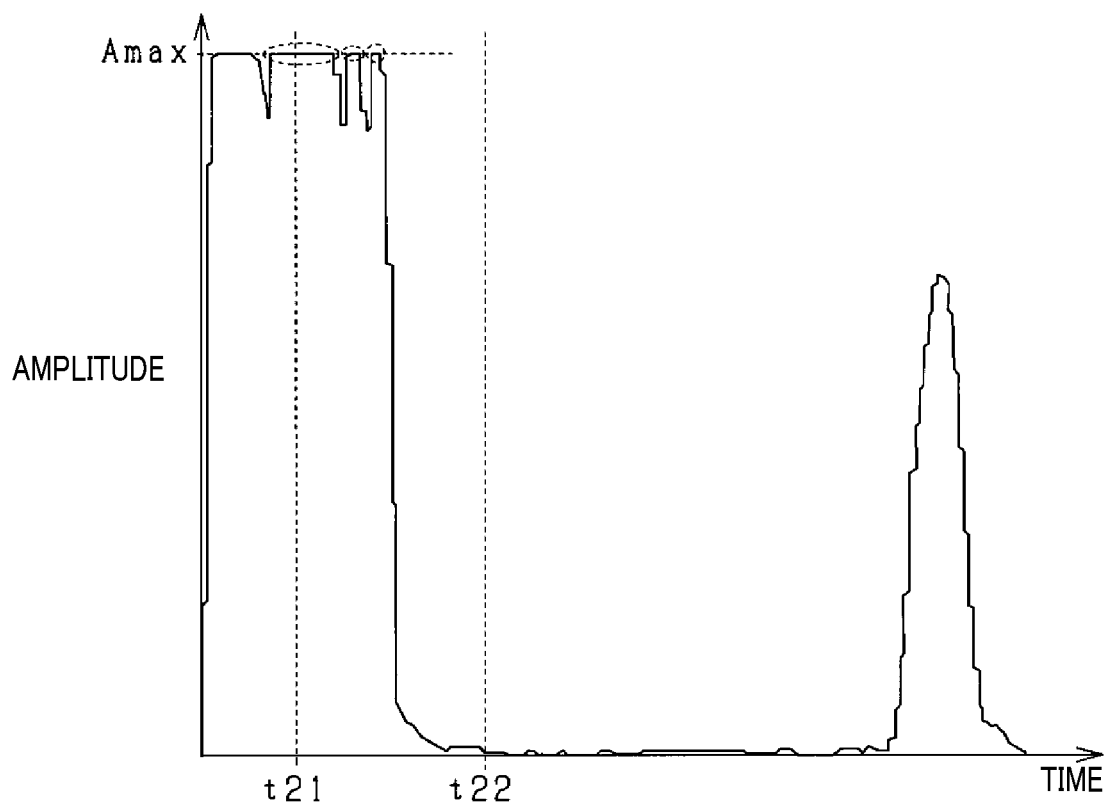
FIG. 7 is a diagram for describing processing relating to a third embodiment, for the case in which foreign matter does not adhere to the transmitter/receiver.
Figure 8:
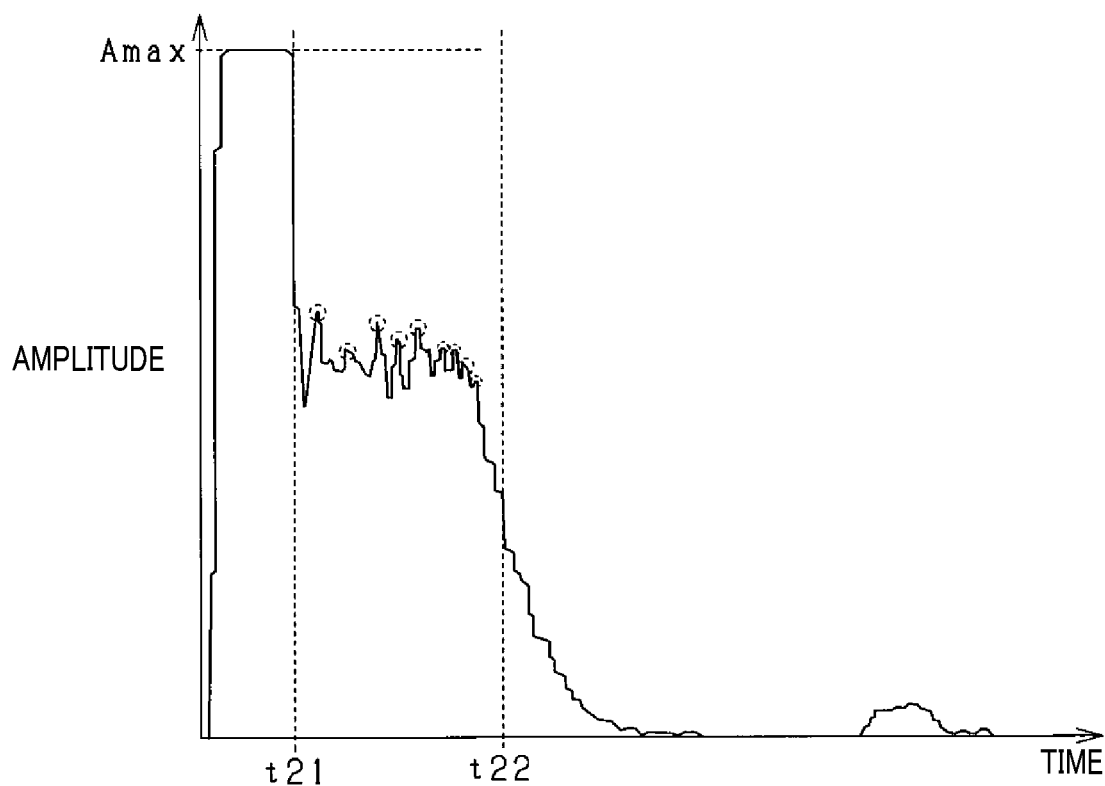
FIG. 8 is a diagram for describing processing relating to the third embodiment, for the case in which foreign matter adheres to the transmitter/receiver.

The processing of the amplitude with the present embodiment will next be described, referring to FIGS. 7 and 8. In FIGS. 7 and 8, time point t21 is the start of an interval in which the number of local maximums is counted and which ends at time point t22. In FIGS. 7 and 8, as for the second embodiment, the locations of the local maximums are enclosed by dashed lines.

If there is no foreign matter adhering to the transmitter/receiver 12, as shown in FIG. 7, the amplitude will generally be maintained close to an upper limit value Amax during the reverberation interval, and will become attenuated when the reverberation interval terminates. For that reason, the number of local maximums that are obtained in the interval from t21 to t22 will become small.

On the other hand, if there is foreign matter adhering to the transmitter/receiver 12, as shown in FIG. 7, then the amplitude will repetitively increase and decrease in the vicinity of a certain value during the reverberation interval. For that reason, the number of local maximums obtained during the interval from t21 to t22 becomes large.

Due to the above configuration, the ultrasonic sensor 10 of the present embodiment provides the following effects, in addition to effects similar to those provided by the ultrasonic sensor 10 of the first embodiment.

In the processing executed for obtaining the amplitude of the detection waves, an upper limit value Amax is provided for the value that can be obtained, and if the actual amplitude is greater than the upper limit value Amax, processing is executed for setting the amplitude of the detection waves as the upper limit value Amax. If there is no foreign matter adhering to the transmitter/receiver 12, then since the attenuation of the amplitude of the detection waves during the reverberation interval is small, the amplitude becomes the upper limit value Amax. Hence, the number of local maximums of the amplitude becomes small. On the other hand, if there is foreign matter adhering to the transmitter/receiver 12, then the attenuation of the amplitude of the detection waves during the reverberation interval will be relatively great, so that the amplitude becomes smaller than Amax. Hence, if there is foreign matter adhering to the transmitter/receiver 12, the number of local maximums of the amplitude will become greater than for the case in which no foreign matter adheres, so that a judgement can be made as to whether or not there is adherence of foreign matter, from the number of these local maximums.

Fourth Embodiment

Figure 9:
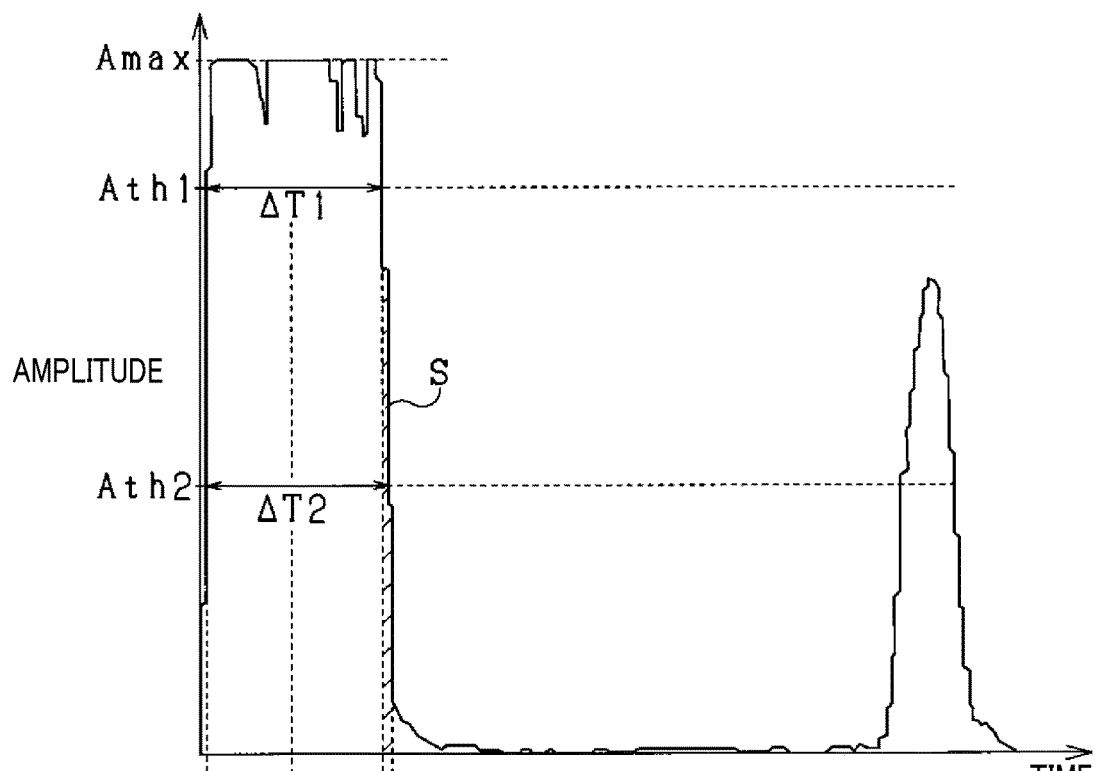
FIG. 9 is a diagram for describing processing relating to a fourth embodiment, for the case in which foreign matter does not adhere to the transmitter/receiver.
Figure 10:
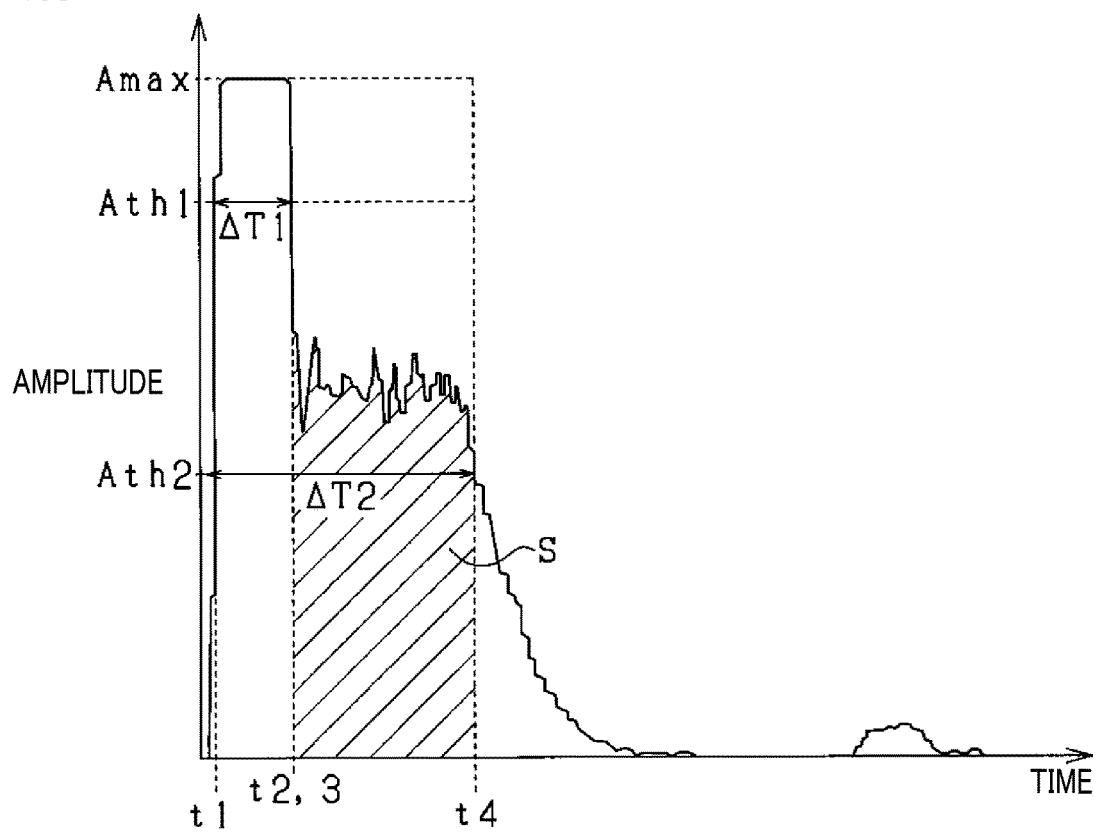
FIG. 10 is a diagram for describing processing relating to the fourth embodiment, for the case in which foreign matter adheres to the transmitter/receiver.

The present embodiment differs from the first embodiment with respect to a part of the processing executed by the judgement section 17. The processing executed by the judgement section 17 of the present embodiment will be described referring to FIGS. 9 and 10.

The judgement section 17 obtains an area S that is enclosed by the envelope which extends from the point at which the amplitude falls below the first threshold value Ath1 up to the point at which it falls below the second threshold value Ath2. Specifically, the amplitudes at each of respective sampling periods are accumulated, and the cumulative value is set as the area S.

The judgement section 17 judges whether or not the calculated area S is greater than a prescribed value. If the area S is greater than the prescribed value, then it is judged that there is matter such as water adhering to the transmitter/receiver 12, and that judgement result is notified to the control section 11.

It should be noted that when the area S is obtained surrounded by an envelope as with the present embodiment, it would be equally possible to set a prescribed interval following the point at which the amplitude falls below the first threshold value Ath1, as with the second embodiment, and to obtain the area S for that interval.

Due to the above configuration, the ultrasonic sensor 10 of the present embodiment provides the following effects, in addition to effects similar to those provided by the ultrasonic sensor 10 of the first embodiment.

If there is foreign matter is adhering to the transmitter/receiver 12, then the frequency during the reverberation interval becomes changed, and the duration of the interval from the point at which the amplitude falls below the first threshold value Ath1 up to the point at which it falls below the second threshold value Ath2 becomes increased. As a result, the area S enclosed by the envelope of amplitudes will become larger. With the present embodiment, since a decision is made as to whether or not the area S enclosed by that envelope is greater than a prescribed value, a judgement can be made as to whether or not the frequency during the reverberation interval deviates from the frequency of the probe waves. Hence, it becomes possible to accurately judge whether or not there is foreign matter is adhering to the transmitter/receiver 12.

Fifth Embodiment

Figure 11:
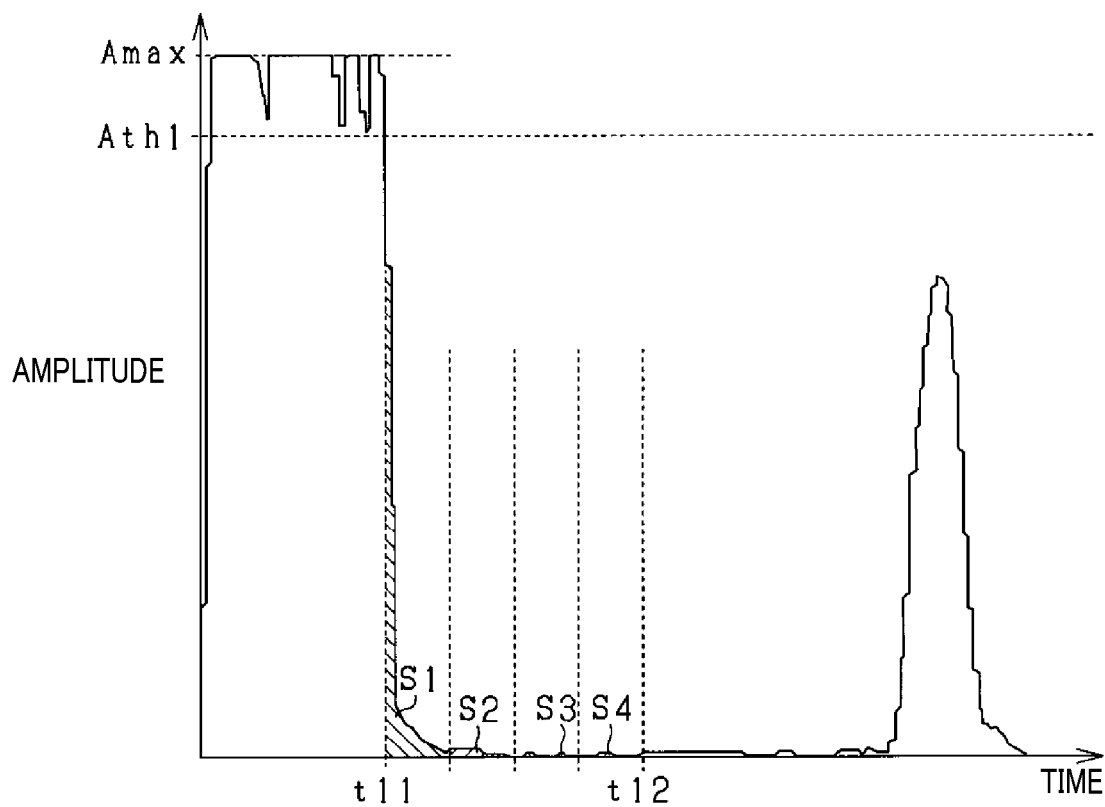
FIG. 11 is a diagram for describing processing relating to a fifth embodiment, for the case in which foreign matter does not adhere to the transmitter/receiver.
Figure 12:
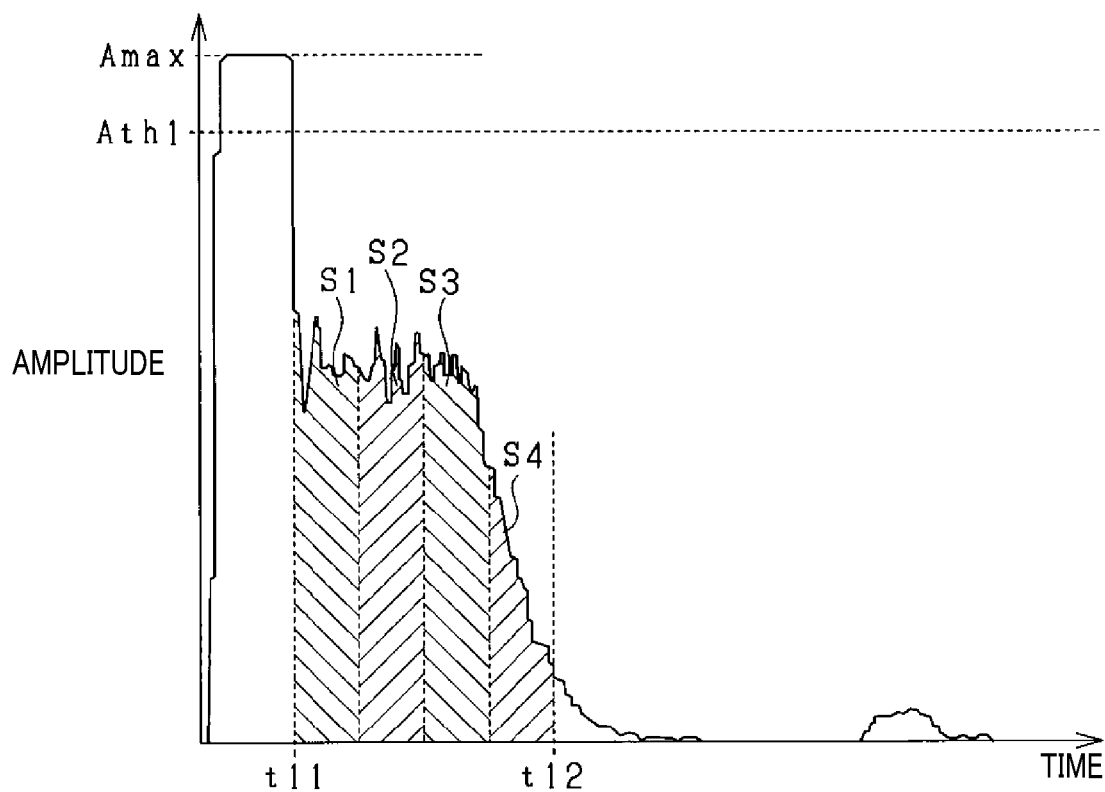
FIG. 12 is a diagram for describing processing relating to the fifth embodiment, for the case in which foreign matter adheres to the transmitter/receiver.

The present embodiment differs from the above embodiments with respect to a part of the processing executed by the judgement section 17. The processing executed by the judgement section 17 of the present embodiment will be described referring to FIGS. 11 and 12.

The judgement section 17 provides a plurality of prescribed intervals which follow the point at which the amplitude falls below the first threshold value Ath1. With the present embodiment, there are 4 prescribed intervals provided, having respectively identical lengths of period. Areas S1 to S4 are calculated for the respective periods. The processing for calculating these areas S1 to S4 is the same as that for the area S of the fourth embodiment.

The judgement section 17 next calculates the amounts of change in the areas S1~S4. In doing this, the average of the amounts of change between the areas S1~S4 may be used, or the difference could be obtained between the area S1 having the largest value and the area S4 having the smallest value, or the differences between the areas that are mutually preceding and succeeding could be obtained, and the largest one of these differences used. Furthermore, it would be equally possible to obtain an approximate function based on the values of the areas S1-S4 and to perform judgement based on the approximate function. For each of these cases, if there is adherence of foreign matter, the amount of change in area will be greater than when foreign matter is not adhering. Hence, a decision can be made as to whether there is adherence of foreign matter, by comparing the value of the amount of change in area with a prescribed value, and determining that there is adherence of foreign matter if the value of the amount of change in area is greater than the prescribed value.

It should be noted that in the processing for setting the plurality of periods with the present embodiment, the prescribed intervals can extend from time point at which the probe waves are terminated, as with the third embodiment. In that case, if there is no adherence of foreign matter, the amplitude will greatly decrease when the reverberation interval ends, so that if the change in area is small, it can be judged that there is adherence of foreign matter.

Due to the above configuration, the ultrasonic sensor 10 of the present embodiment provides the following effects, in addition to effects similar to those provided by the ultrasonic sensor 10 of the first embodiment.

If there is foreign matter is adhering to the transmitter/receiver 12, then the amplitude during the reverberation interval becomes attenuated. Hence, by obtaining a plurality of areas S1~S4 that are enclosed by amplitude envelopes, and judging whether or not these areas are becoming attenuated, a decision can be made as to whether there is foreign matter adhering to the transmitter/receiver 12.

Sixth Embodiment

The present embodiment differs from the above embodiments with respect to a part of the processing executed by the judgement section 17. With the present embodiment, the judgement section 17 compares a part of the detection waves with a reference waveform, which has been predetermined. The reference waveform is a waveform that has been measured beforehand in a case in which there is no foreign matter adhering to the transmitter/receiver 12. If the correlation between the waveform of the detection waves and the reference waveform is obtained and the correlation value is greater than a prescribed value, then since it can be said that the shape of the waveform of the detection waves is close to that of the reference waveform, it is judged that there is no foreign matter adhering to the transmitter/receiver 12. On the other hand, if the correlation value is smaller than the prescribed value, then since it can be said that the shape of the waveform of the detection waves deviates from that of the reference waveform, it is judged that there is foreign matter adhering to the transmitter/receiver 12.

It should be noted that although a waveform which is measured beforehand in a condition in which there is no foreign matter adhering to the transmitter/receiver 12 is used here as the reference waveform, it would be equally possible to use, as the reference waveform, a waveform for the case in which there is foreign matter adhering to the transmitter/receiver 12. Furthermore, it would be equally possible to provide beforehand a waveform for the case in which there is foreign matter adhering to the transmitter/receiver 12 and a waveform for the case in which there is no adherence of foreign matter, respectively, and to judge which of these waveforms is closest in shape to the waveform of the detection waves.

Due to the above configuration, the ultrasonic sensor 10 of the present embodiment provides effects that are similar to those provided by the ultrasonic sensor 10 of the first embodiment.

Seventh Embodiment

The overall configuration of the present embodiment is similar to that of the first embodiment, with a part of the processing being different. With the present embodiment, the detection wave processing section 13 is provided with two bandpass filters having respectively different widths of passband. The center frequency of each of these bandpass filters is the frequency of the detection waves. It should be noted that in the following description, the bandpass filter having the narrower one of the passbands is referred to as the first bandpass filter, and the bandpass filter having the wider passband is referred to as the second bandpass filter.

The detection wave processing section 13 executes, in parallel, processing for passing the acquired detection waves through the first bandpass filter and through the second bandpass filter. Next, the processing of the flow chart shown in FIG. 4 is applied to the detection waves that have passed through the first bandpass filter and have passed through the second bandpass filter, respectively, with the interval during which the amplitude is smaller than the first threshold value Ath1 and is greater than the second threshold value Ath2 being respectively obtained for these, that is to say, the value resulting from subtracting the first interval $\Delta T1$ from the second interval $\Delta T2$ is obtained. The respective calculated values are then compared, and a decision is made as to whether or not there is foreign matter adhering to the transmitter/receiver 12.

If there is no foreign matter adhering to the transmitter/receiver 12, then since the frequency of the detection waves during the reverberation interval will be close to the frequency of the probe waves, the amplitudes of the respective detection waves which pass through the bandpass filters will not become readily attenuated, irrespective of which of the filters is passed through. Hence, the value obtained by subtracting the first interval $\Delta T1$ from the second interval $\Delta T2$ will be substantially the same for the detection waves that are passed by the first bandpass filter and the detection waves that are passed by the second bandpass filter.

If there is foreign matter adhering to the transmitter/receiver 12, then since the frequency of the detection waves during the reverberation interval will be different from the frequency of the probe waves, the detection waves that pass through the first bandpass filter will have a relatively high degree of attenuation in amplitude, while the degree of amplitude attenuation of the detection waves that pass through the second bandpass filter will be relatively small. Hence, the value obtained by subtracting the first interval $\Delta T1$ from the second interval $\Delta T2$ will be greater for the detection waves that are passed by the second bandpass filter.

It should be noted that it would be equally possible to apply processing for effecting passing of detection waves through two bandpass filters, as performed with the present embodiment, to the second and third embodiments. That is to say, instead of comparing the number of local maximums of the amplitude with a predetermined value, it would be equally possible to compare the respective numbers of local maximums of the amplitude of detection waves that have passed through bandpass filters having different passbands, and judgement could be performed by using the difference between them.

Furthermore, it would be equally possible to apply processing for effecting passing of detection waves through two bandpass filters, as performed with the present embodiment, to the fourth embodiment. If there is no foreign matter adhering to the transmitter/receiver 12, then the frequency during the reverberation interval will be close to the frequency of the probe waves, and hence, even when the detection waves have been passed through bandpass filters having passbands that are different from one another, the variation of amplitude with time will be closely similar between the detection waves, and the correlation value will be relatively large. On the other hand, if there is foreign matter adhering to the transmitter/receiver 12, then the variation of amplitude with time will be different between them, so that the correlation value will be relatively small. Hence, a judgement can be made as to whether or not there is adherence of foreign matter.

Due to the above configuration, the ultrasonic sensor 10 of the present embodiment provides effects that are similar to those provided by the ultrasonic sensor 10 of the first embodiment, and also provides the following effects.

When the detection waves are passed through a bandpass filter having a wide passband, then irrespective of whether or not the frequency deviates from the center frequency, the amplitude will not be significantly attenuated. On the other hand, if the detection waves are processed by means of a bandpass filter having a narrow passband, then if the frequency deviates from the center frequency, the amplitude will be relatively greatly attenuated. Hence, it is possible to judge whether or not there is foreign matter is adhering to the transmitter/receiver 12 by comparing detection waves that have passed through bandpass filters having respectively different passbands.

Modified Examples

With the above embodiments, in addition to using the relationship between amplitude and time, it would be possible to also use frequency in judging whether or not there is foreign matter adhering to the transmitter/receiver 12. Specifically with each of the above embodiments, the judgement conditions are set as a first condition, and a second condition which is whether or not a frequency deviates from the frequency of the probe waves, with the first condition and the second condition being used in judging whether or not foreign matter is adhering to the transmitter/receiver 12. It should be noted that it would be equally possible for the second condition to include a requirement relating to time, for each of the above embodiments.

With the first embodiment, the time measurement of the first interval ΔT1 and the second interval ΔT2 is started on condition that the amplitude falls below the first threshold value Ath1. However, it would be equally possible to commence the time measurement of the first interval ΔT1 and the second interval ΔT2 at time point of commencement of transmitting the probe waves.

With the first embodiment, time measurement of the first interval ΔT1 and the second interval ΔT2 is performed, and the difference between the measured values is obtained. However, it would be equally possible to set, as a required condition for starting the time measurement, that the amplitude is less than the first threshold value Ath1 and is greater than the second threshold value Ath2, and to set, as a required condition for ending the time measurement, that the amplitude is less than the second threshold value Ath2. In that case, the judgement as to whether or not there is adhering foreign matter can be performed by comparing the measured value of time with a prescribed value.

With the above embodiments, bandpass filters are used; however, it would be equally possible to use band-stop filters instead. Furthermore, since the frequency becomes lower if there is foreign matter adhering to the transmitter/receiver 12, it would be equally possible to use detection waves that have been passed through a high-pass filter, in the processing for judging whether or not there is adhering foreign matter. This is similarly true for the fifth embodiment, where it would be equally possible to use high-pass filters or band-stop filters having respectively different passbands.

With the second embodiment, the number of local maximums of the amplitude is obtained during a predetermined interval which commences when the amplitude becomes less than the first threshold value Ath1. However, it would be equally possible to obtain the number of local maximums during an interval in which the amplitude is less than the first threshold value Ath1 and is greater than the second threshold value Ath2. As shown by the first embodiment, that interval, in which the amplitude is less than the first threshold value Ath1 and is greater than the second threshold value Ath2, is longer when there is foreign matter adhering to the transmitter/receiver 12 than when there is no adhering foreign matter. Furthermore, since, if there is no adhering foreign matter, the amplitude will generally decrease monotonically from the point at which it becomes less than the first threshold value Ath1 until it becomes less than the second threshold value Ath2, so that the possibility of producing maximum values is low. Hence, judgement can accurately be made as to whether or not foreign matter is adhering to the transmitter/receiver 12, by obtaining the number of local maximums of the amplitude during the interval in which the amplitude is less than the first threshold value Ath1 and is greater than the second threshold value Ath2.

With the second embodiment, instead of obtaining the number of local maximums, it would be equally possible to perform the judgement as to adhering foreign matter on the transmitter/receiver 12 by using the highest-magnitude one of the local maximums, or by using the average magnitude of the local maximums, etc. If there is no foreign matter adhering to the transmitter/receiver 12, then since in that case the point at which the amplitude becomes less than the first threshold value Ath1 is the termination of the reverberation interval, the amplitude will continue to become attenuated thereafter, until a condition is reached where it can hardly be detected. For that reason, the maximum amplitude will be small. On the other hand, if there is foreign matter adhering to the transmitter/receiver 12, then the point at which the amplitude becomes less than the first threshold value Ath1 is the termination of transmitting the probe waves, and the amplitude will repetitively increase and decrease during the reverberation interval thereafter, so that there will be relatively large maximum values of the amplitude. Hence, a decision can be made as to whether foreign matter is adhering to the transmitter/receiver 12, from the maximum value of the amplitude during a predetermined interval that follows the point at which the amplitude becomes less than the first threshold value Ath1.

With the third embodiment, instead of using the number of local maximums, it would be equally possible to judge whether foreign matter is adhering to the transmitter/receiver 12 by using the highest one of the local maximums of the amplitude, or by using the average of the local maximums, etc. Since the attenuation of the amplitude during the reverberation interval will be relatively small if no foreign matter is adhering to the transmitter/receiver 12, there will be a relatively large maximum value of the amplitude during that interval, while if there is foreign matter adhering to the transmitter/receiver 12 then there will be a relatively high degree of attenuation of the amplitude during the reverberation interval, so that the maximum value of the amplitude will be relatively small. Hence, a decision can be made as to whether foreign matter is adhering to the transmitter/receiver 12, from the maximum value of the amplitude during a predetermined interval that follows the termination of transmitting the probe waves.

With the fifth embodiment, processing is performed using bandpass filters, in parallel, having respectively different passbands. However, it would be equally possible to perform processing for passing the detection waves through bandpass filters which have respectively different transmission intervals, for example a preceding and a succeeding transmission interval.

With the fifth embodiment, two bandpass filters having respectively different passbands are used; however, it would be equally possible to use three or more bandpass filters. Moreover, it would be equally possible to compare detection waves that have been passed by filters having respectively different functions. For example, the detection waves passed by a bandpass filter could be compared with the detection waves passed by a high-pass filter, or compared with the detection waves passed by a band-stop filter.

The ultrasonic sensor 10 of the embodiments is installed on a mobile body such as a vehicle; however, the ultrasonic sensor 10 is not limited to such installation, and could be installed on a stationary object such as a road structure or the like.

The present disclosure has been described based on embodiments, however, it should be understood that the disclosure is not limited to the embodiments or their configurations. The present disclosure incorporates various modifications and equivalences within its scope. Furthermore, other combinations and forms, including single elements or more, are contained in the scope and concepts of the present disclosure.

The invention claimed is:

1. A method of transmitting and receiving from an ultrasonic sensor, the ultrasonic sensor transmitting probe waves, which are ultrasonic waves, and acquiring detection waves that include reflected waves which have been reflected from surrounding objects, the method comprising:
   transmitting the probe waves and acquiring the detection waves from a single transmitter/receiver;
   executing filter processing of the detection waves in which frequencies within a predetermined frequency band that includes the frequency of the probe waves are passed;
   measuring an amplitude of the detection waves that are transmitted during a reverberation interval of the transmitter/receiver, the reverberation interval comprising a time interval after termination of transmission of the probe waves; and
   executing a judgement of whether foreign matter is adhered to the transmitter/receiver, the judgement being determined based on a relationship between a time axis and values of the amplitude of the detection waves of the transmitter/receiver during the reverberation interval, wherein
   the judgement of whether foreign matter is adhered to the transmitter/receiver comprises:
      acquiring, as the relationship between the time axis and the amplitude, an interval extending from the point at which the amplitude falls below a first threshold value until the amplitude falls below a second threshold value; and
      executing the judgement of whether foreign matter is adhered to the transmitter/receiver based on a length of the acquired interval.

2. The method of transmitting and receiving from the ultrasonic sensor according to claim 1, further comprising:
   providing, as the time axis, a prescribed interval that follows the point at which the amplitude falls below a threshold value;
   acquiring a count of a number of local maximums of the amplitude in the prescribed interval; and
   executing the judgement based on that count.

3. The method of transmitting and receiving from the ultrasonic sensor according to claim 1, further comprising:
   providing, as the time axis, a prescribed interval that follows the point at which the amplitude falls below a threshold value; and
   executing the judgement based on the maximum value of the amplitude in the prescribed interval.

4. The method of transmitting and receiving from the ultrasonic sensor according to claim 1, further comprising:
   providing, as the time axis, a prescribed interval that follows termination of transmitting the probe waves;
   acquiring a count of a number of local maximums of the amplitude in the prescribed interval; and
   executing the judgement based on that count.

5. The method of transmitting and receiving from the ultrasonic sensor according to claim 1, further comprising:
   providing, as the time axis, a prescribed interval that follows the termination of the transmitting of the probe waves; and
   executing the judgement based on the maximum value of the amplitude in the prescribed interval.

6. The method of transmitting and receiving from the ultrasonic sensor according to claim 1, further comprising:
   acquiring, as the relationship between the time axis and the amplitude, an area enclosed by an envelope of values of the amplitude; and
   executing the judgement based on that area.

7. The method of transmitting and receiving from the ultrasonic sensor according to claim 6, further comprising:
   acquiring the area after the amplitude has fallen below a threshold value; and
   executing the judgement based on that area.

8. The method of transmitting and receiving from the ultrasonic sensor according to claim 6, further comprising:
   acquiring respective areas for each of prescribed intervals, following termination of transmitting the probe waves; and
   executing the judgement based on changes in the areas.

9. The method of transmitting and receiving from the ultrasonic sensor according to claim 1, further comprising setting an upper limit value to the values that can be acquired for the amplitude, and when the amplitude of the detection waves is greater than the upper limit value, making the amplitude of the detection waves the upper limit value.

10. The method of transmitting and receiving from the ultrasonic sensor according to claim 1, further comprising executing the judgement by comparing a relationship between the time axis and the amplitude that is based on the acquired detection waves with a predetermined relationship between the time axis and the amplitude.

11. The method of transmitting and receiving from the ultrasonic sensor according to claim 1, wherein
   the ultrasonic sensor is equipped with a plurality of filters which pass respectively different frequency bands, and the method of transmitting and receiving from the ultrasonic sensor further comprises:

comparing the relationships between the time axis and the amplitude for the respective outputs passed by the different filters; and executing the judgement by means of the comparison result.

12. The method of transmitting and receiving from the ultrasonic sensor according to claim 1, further comprising:

acquiring the correlation value between a waveform expressing the time-axis variation of the amplitude and a waveform serving as a reference; and executing the judgement by means of the correlation value.

13. The method of transmitting and receiving from the ultrasonic sensor according to claim 1, wherein the ultrasonic sensor is equipped with a plurality of filters which pass respectively different frequency bands, and the method of transmitting and receiving from the ultrasonic sensor further comprises:

acquiring a correlation value between respective waveforms that express the time-axis variation of the amplitudes passed by the different filters; and executing the judgement by means of the correlation value.

14. The method of transmitting and receiving from the ultrasonic sensor according to claim 1, wherein the ultrasonic sensor further acquires the frequency of the probe waves, and the method of transmitting and receiving from the ultrasonic sensor further comprises:

comparing the acquired frequency with a frequency that serves as a reference frequency of the probe waves; and executing the judgement by using a first condition that is based on time and amplitude, and a second condition that is based on frequency.

* * * * *